(12) United States Patent
Han et al.

(10) Patent No.: US 11,038,180 B2
(45) Date of Patent: Jun. 15, 2021

(54) UNIT CELL FOR REDOX FLOW BATTERY, FOR REDUCING PRESSURE DROP CAUSED BY ELECTROLYTE FLOW IN STACK

(71) Applicant: H2, INC., Daejeon (KR)

(72) Inventors: Shin Han, Daejeon (KR); Chang Hoon Han, Daejeon (KR); Jee Hyang Huh, Daejeon (KR); Yujong Kim, Daejeon (KR)

(73) Assignee: H2, INC., Daejeon (KR)

( * ) Notice: Subject to any disclaimer, the term of this patent is extended or adjusted under 35 U.S.C. 154(b) by 150 days.

(21) Appl. No.: 16/308,107

(22) PCT Filed: Aug. 5, 2016

(86) PCT No.: PCT/KR2016/008634
§ 371 (c)(1),
(2) Date: Dec. 7, 2018

(87) PCT Pub. No.: WO2018/026036
PCT Pub. Date: Feb. 8, 2018

(65) Prior Publication Data
US 2019/0165385 A1 May 30, 2019

(51) Int. Cl.
*H01M 8/0258* (2016.01)
*H01M 8/0273* (2016.01)
*H01M 8/18* (2006.01)

(52) U.S. Cl.
CPC ....... *H01M 8/0258* (2013.01); *H01M 8/0273* (2013.01); *H01M 8/18* (2013.01); *H01M 8/188* (2013.01); *Y02E 60/50* (2013.01)

(58) Field of Classification Search
CPC .... H01M 8/0258; H01M 8/0273; H01M 8/18; H01M 8/188; H01M 4/8615; H01M 4/86–8673; Y02E 60/528
See application file for complete search history.

(56) References Cited

U.S. PATENT DOCUMENTS

| 6,905,797 B2 | 6/2005 | Broman et al. |
| 2012/0244395 A1 | 9/2012 | Perry |

(Continued)

FOREIGN PATENT DOCUMENTS

| JP | 2006-324117 A | 11/2006 |
| JP | 2013-232434 A | 11/2013 |

(Continued)

OTHER PUBLICATIONS

European Search Report dated Jan. 14, 2020.

*Primary Examiner* — Cynthia H Kelly
*Assistant Examiner* — Kirsten B Tysl
(74) *Attorney, Agent, or Firm* — Rabin & Berdo, P.C.

(57) ABSTRACT

Provided is a redox flow battery stack comprising: an ion-exchange membrane (1000); two flow frames (2000A, 2000B) disposed on both sides of the ion-exchange membrane (1000), respectively; two bipolar plates (4000A, 4000B) disposed outside the flow frames (2000A, 2000B), respectively; and electrodes disposed in cavities inside outer frames of the flow frames (2000A, 2000B), respectively, in which at least two electrodes are disposed in the flow frames, respectively, and at least three furrows in which the electrolyte flows are formed between electrodes or between the electrode and the outer frame in the flow frame.

1 Claim, 14 Drawing Sheets

(56) References Cited

U.S. PATENT DOCUMENTS

2013/0022846 A1* 1/2013 Liu .................. H01M 4/96
                                                          429/81
2014/0060666 A1   3/2014 Evans et al.

FOREIGN PATENT DOCUMENTS

KR   10-2013-0054548 A   5/2013
KR   10-2014-0010713 A   1/2014
WO   WO 2013/095378 A1   6/2013

* cited by examiner

UNIT CELL FOR REDOX FLOW BATTERY, FOR REDUCING PRESSURE DROP CAUSED BY ELECTROLYTE FLOW IN STACK

BACKGROUND OF THE INVENTION

Field of the Invention

The present invention relates to a unit cell for a redox flow battery, and more particularly, to a unit cell for a redox flow battery for reducing pressure drop in a flow frame.

Description of the Related Art

A redox flow battery is one of core products closely related to renewable energy, reduction in greenhouse gas, rechargeable batteries, and smart grids, which have been attracting the greatest attention in the world in recent years. A fuel cell is a product which is expanding rapidly in the market in the world as a renewable energy source to replace fossil fuels without emission of pollutants. Currently, most of the energy is derived from fossil fuels, but there is a problem in that the use of such fossil fuels has serious adverse environmental impacts such as air pollution, acid rain and global warming, and low energy efficiency.

In recent years, in order to solve the problems caused by the use of such fossil fuels, interest in renewable energy and fuel cells has rapidly increased. Interests and research on such renewable energy are being actively performed not only in domestic but also worldwide.

Although the renewable energy market has entered the maturity stage both domestically and internationally, there is a problem that the amount of energy generated due to environmental influences such as time and weather is greatly changed due to the nature of renewable energy. As a result, the spread of an energy storage system (ESS) for storing regeneration energy generated for stabilization of renewable energy generation is very required, and the redox flow battery is attracting attention as such a large-capacity energy storage system.

A lot of technologies for the fuel cells have already been developed due to environmental friendliness and unlimited supply of resources, and fuel cell vehicles, generators, and heating supply devices using the fuel cells have been developed and being sold. However, there is a disadvantage in that manufacture, assembly and maintenance of the fuel cells are still difficult.

A general structure of the redox flow battery to which the present invention is applied is configured by a stack with stacked cells in which an electrochemical reaction occurs, tanks for storing electrolytes, and pumps for supplying electrolytes to the stack from the tanks.

As shown in FIG. 1, a unit cell of the general redox flow battery is configured by a structure of a bipolar plate 400A—an electrode 300A—a flow frame 200A—a membrane 100—a flow frame 200B—an electrode 300B—a bipolar plate 400B, and the bipolar plates 400A and 400B are mainly made of carbon materials and serve to prevent the electrolyte from passing therethrough while electrically connecting the unit cells.

The flow frames 200A and 200B include flow paths 230A and 240A; 230B and 240B forming channels, round holes 210A and 220A; 210B and 220B, and inner hollow spaces 250A and 250B in which electrodes 300A and 300B are disposed, respectively.

In FIG. 1, the flow path of the flow frame 200B is not shown, but like the flow frame 200A, even in the flow frame 200B, flow paths corresponding to the flow paths 230A and 240A are formed on the surfaces which are not shown in FIG. 1 and represented by 230B and 240B in FIG. 2.

Even in the bipolar plates 400A and 400B, holes 410A, 420A; 410B, 420B are formed at positions corresponding to the holes 210A, 220A; 210B, 220B of the flow frames 200A and 200B, and in the stack, as shown in FIG. 2, the bipolar plates, the holes 210A, 220A; 210B, 220B; 310A, 320A; 310B, 320B of the flow frames form a manifold.

The electrodes 300A and 300B are disposed in the inner hollow spaces 250A and 250B of the flow frames 200A and 200B and compressed to a predetermined thickness by the bipolar plates 400A and 400B and a membrane.

A membrane 100 is disposed between an anode and a cathode and serves to separate the anode and the cathode and selectively transmit ions.

In the flow cell, the electrolyte is stored in tanks of the anolyte and the catholyte and flows through the stack formed of a plurality of unit cells, and a pump is disposed between the tank and the stack to circulate the electrolyte in the tank through the inside of the stack.

As shown in FIG. 2, when the plurality of unit cells are stacked, the holes 410A, 420A; 410B, 420B of the bipolar plates 400A and 400B, the holes 210A, 220A; 210B, 220B of the flow paths 200A and 200B corresponding thereto, the flow paths 230A, 240A; 230B, 240B and the inner hollow spaces 250A and 250B form an electrolyte flow field as shown in arrows.

FIG. 3 shows the flow of the electrolyte in the flow frame 200A and it can be seen that the electrolyte flows in the order of manifold (inlet; 210A)→flow path 230A→electrode 300A in the inner hollow space 250A→flow path 240A→manifold (outlet; 220A).

FIG. 4 is a front view of a conventional flow frame (an opposite surface of an ion-exchange membrane), and FIG. 5 is a three-dimensional perspective view of a conventional flow frame.

In some cases, the flow frame is formed of a plurality of frames.

As such, the electrolyte in a liquid state is circulated inside the stack by the pump and power is consumed to operate the pump, so that the efficiency of the overall system is reduced in association with the power consumed by the pump.

Reducing the power consumption of the pump plays an important role in increasing the efficiency of the system, and the power consumption of the pump is closely related to the flow rate and pressure drop. As the flow rate is increased or the pressure drop of the flow rate in the system is increased, the power consumption is increased. Also, when the flow rate is increased, the speed increases and the resistance increases, resulting in a higher pressure drop.

The pressure drop inside the stack mainly occurs at three places of the manifold, the flow path, and the electrode. In this case, mainly porous carbon or graphite felt is used in the electrode, and as a result, a considerable pressure drop occurs, and the pressure drop in the electrode occupies 50% or higher of the pressure drop of the entire stack.

Since the pressure drop in the electrode is proportional to the length of the electrode in the flow direction, as the size of the electrode is increased, the pressure drop is increased, thereby reducing the efficiency of the system.

When the flow rate is decreased to reduce the pressure drop, the energy capacity of the system is reduced. However, in order to obtain a large power density, there is a limitation in reducing the flow rate considering the pressure drop in a state where the large energy capacity is required.

Therefore, there is a limitation in achieving high output and improved efficiency of the stack at the same time in the conventional structure, and thus, there have been attempts to solve such a problem.

In the prior art US2012/0244395 A1, in order to reduce a pressure drop in an electrode, two or more channels are dug in a bipolar plate and an electrolyte passes through the electrode while moving between the adjacent channels so as to pass through only a short distance instead of an entire length of the electrode, thereby reducing the pressure drop.

However, in order to implement the invention of the prior art, the channels need to be formed in the bipolar plate. For this purpose, there is a problem in that a thick bipolar plate needs to be used, and a carbon composite material used as a material of the bipolar plate is very expensive, the cost is further increased as the thickness is increased, and considerable cost is consumed in processing or forming the channels.

Also, since the thick bipolar plate is used, the volume and weight of the stack are increased, and the flow in the electrode felt is not perfectly uniform to generate a dead zone, and thus there is a problem in that the electrode is wasted.

Also, in the prior art document U.S. Pat. No. 6,905,797, there is published a stack structure in which a zigzag-shaped flow path is formed in an electrode felt itself. However, there is a problem in that a felt portion cut off to form the flow path can not be used so that materials are wasted, and the flow path formed in the felt is complicated to be difficult in handling so that the degree of difficulty of assembly increases and ununiform flow occurs.

SUMMARY OF THE INVENTION

The present invention has been made in an effort to solve a high pressure drop which is one of general problems of flow cells.

Particularly, in the case of using a technique of forming a channel on a bipolar plate in the related art, there is a problem that the cost of the bipolar plate increases and the volume and weight of the stack increase. In addition, in the case of forming a flow path by processing an electrode felt, there is a problem in that the difficulty of the assembly increases.

Since a high flow rate is required for high power output of the stack, the present invention has been made in an effort to lower the pressure drop of the electrolyte in the stack so that a higher flow rate may be supplied at the same pressure drop.

Further, the present invention has been made in an effort to enhance price competitiveness and reduce the size of the entire system by using an expensive stack material less while the high output is generated.

According to an aspect of the present invention, there is provided a redox flow battery stack comprising: an ion-exchange membrane (1000); two flow frames (2000A, 2000B) disposed on both sides of the ion-exchange membrane (1000), respectively; two bipolar plates (4000A, 4000B) disposed outside the flow frames (2000A, 2000B), respectively; and electrodes disposed in cavities inside outer frames of the flow frames (2000A, 2000B), respectively, in which the cavities of the flow frames include at least two cavities (2610A, 2620A) in which at least two electrodes (3100A, 3200A) are disposed, and in each flow frame, at least three furrows in which the electrolyte flows are formed between the at least two electrodes (3100A, 3200A) and each outer frame (2700A), respectively.

A furrow which is directly or indirectly connected with the hole (2100A) of the flow frame (2000A) forming an inlet manifold may be blocked at an end opposite to the hole (2100A) and the electrolyte flowing in the furrow may flow into an adjacent furrow through an electrode in a lateral direction and the adjacent furrow may be directly or indirectly connected with a hole (2200A) of the flow frame (2000A) forming a discharge manifold.

Each of the at least three furrows may be formed on each side support wall of the cavity formed in the flow frame.

Each of the at least three furrows may be connected with the hole (2100A, 2200A) forming the inlet or outlet manifold through at least one of the flow path and sub flow path, and the depths of the flow path and the sub flow path may be equal to the depth of the furrow formed on the side support wall.

The electrode may have a rectangular shape or other shapes.

The hole (2100A) of the flow frame (2000A) forming the inlet manifold may be connected with three or more sub flow paths (2310A, 2320A, 2330A) through the flow path (2300A), each of the three or more sub flow paths (2310A, 2320A, 2330A) may be connected to the furrows (2312A, 2322A, 2332A) of which the ends are blocked, respectively, the hole (2200A) of the flow frame (2000A) forming the outlet manifold may be connected with two or more sub flow paths (2410A, 2420A) through the flow path (2400A), each of the two or more sub flow paths (2410A, 2420A) may be connected to furrows (2412A, 2422A), respectively, and the three or more sub flow paths (2310A, 2320A, 2330A) with the blocked ends and the two or more sub flow paths (2410A, 2420A) may be formed on the side support walls (2311A, 2321A, 2331A; 2411A, 2421A) of four or more cavities (2610A, 2620A, 2630A, 2640A) in which four or more electrodes (3100A, 3200A, 3300A, 3400A) disposed in the outer frame of the flow frame are disposed.

According to the present invention, it is possible to lower the pressure drop in the stack and use a pump with low power consumption at the same flow rate, and as a result, it is possible to reduce the system cost and reduce the power consumption by the pump, thereby increasing the system efficiency.

Particularly, in the present invention, a channel is formed in a flow frame without forming a channel in a bipolar plate to reduce the use of expensive materials, thereby enhancing cost competitiveness. Further, the electrolyte passes between two or more rectangular felt electrodes to reduce the pressure drop of the electrolyte, thereby improving the system efficiency.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
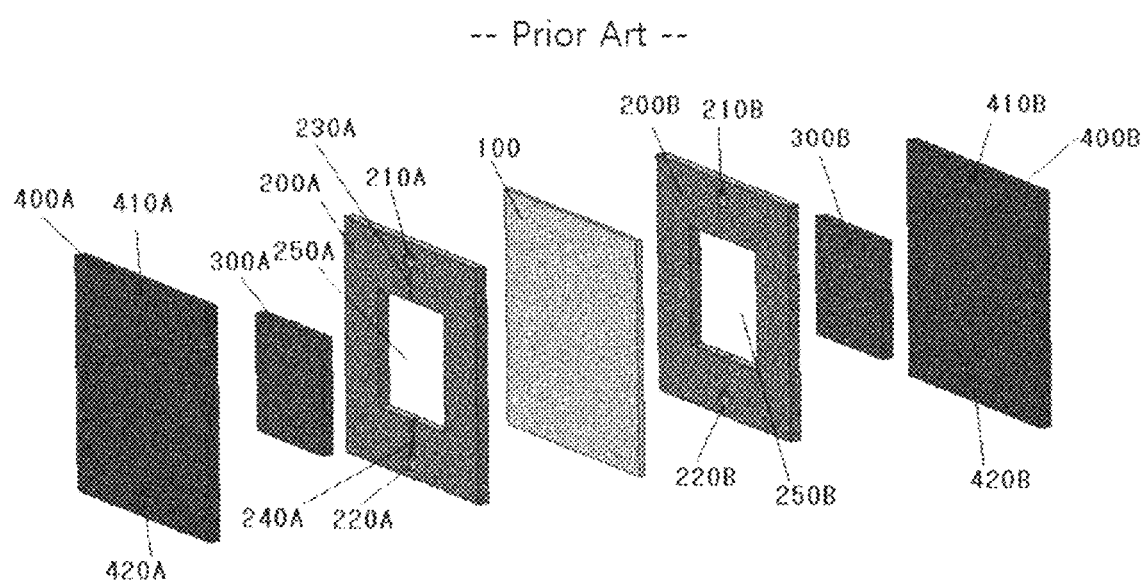
FIG. 1 is an exploded perspective view of a unit cell of a stack for a conventional redox flow battery.
Figure 2:
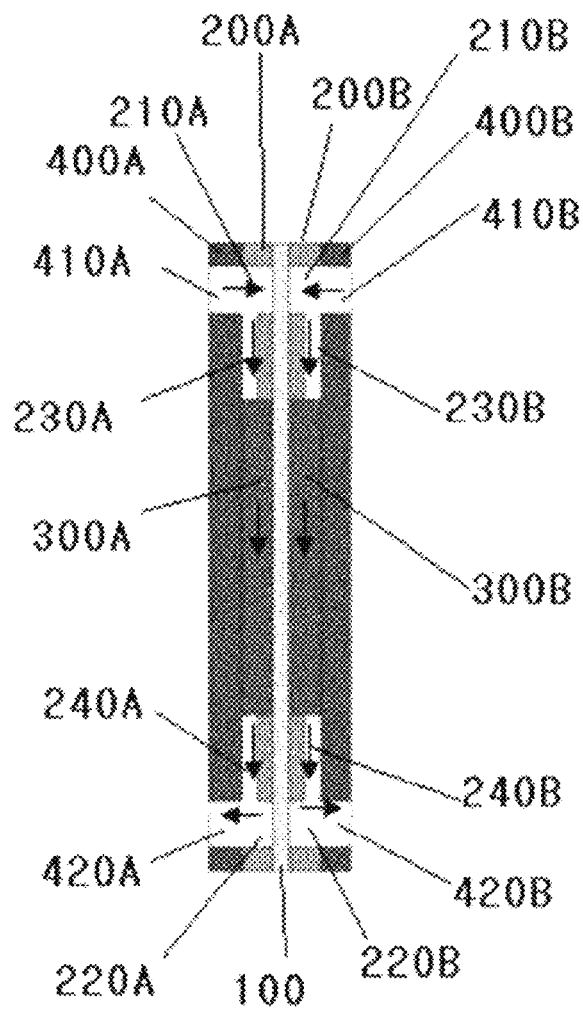
FIG. 2 shows an electrolyte flow direction in the stack for the conventional redox flow battery.
Figure 3:
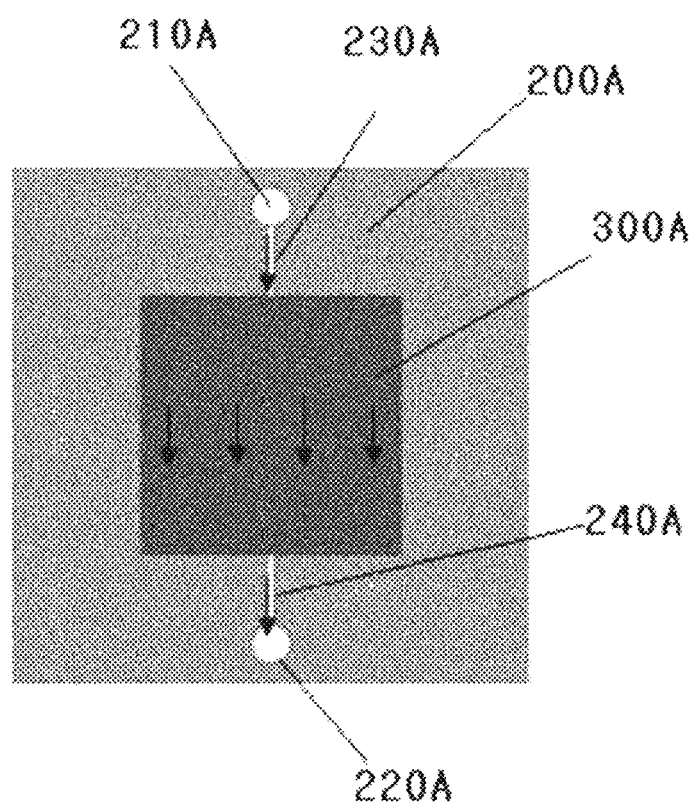
FIG. 3 shows an electrolyte flow direction in a conventional flow frame.
Figure 4:
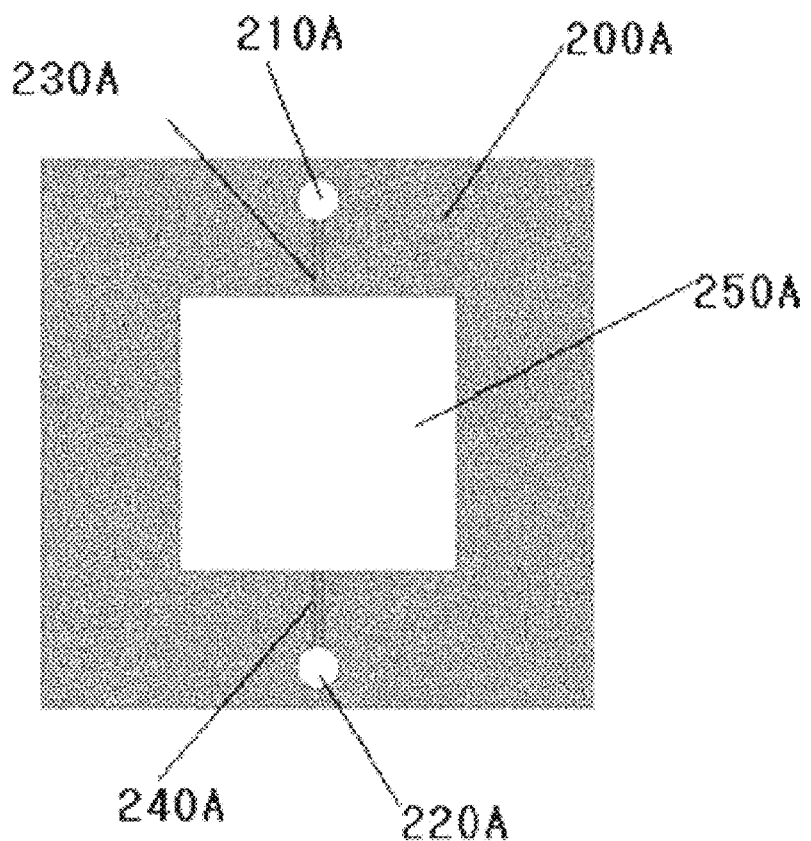
FIG. 4 is a front view of the conventional flow frame.
Figure 5:
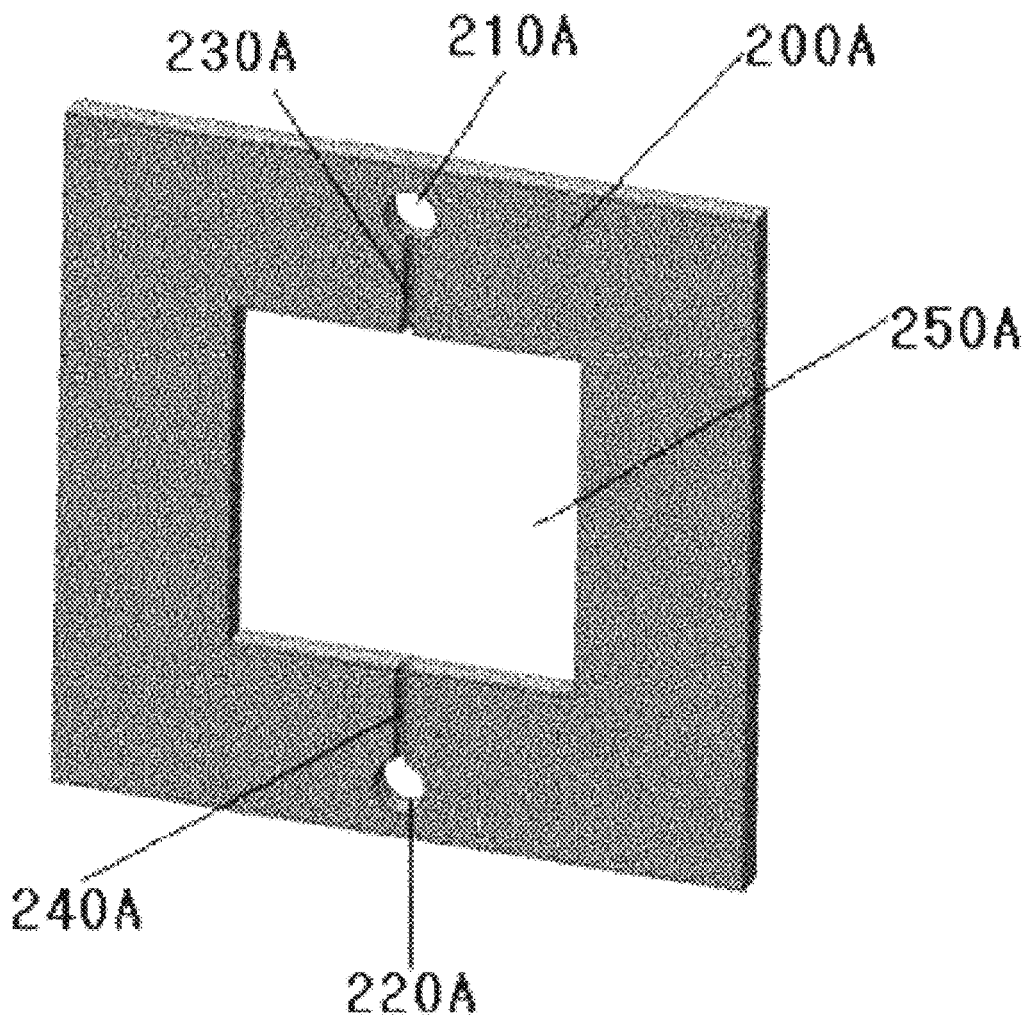
FIG. 5 is a three-dimensional perspective view of the conventional flow frame.
Figure 6:
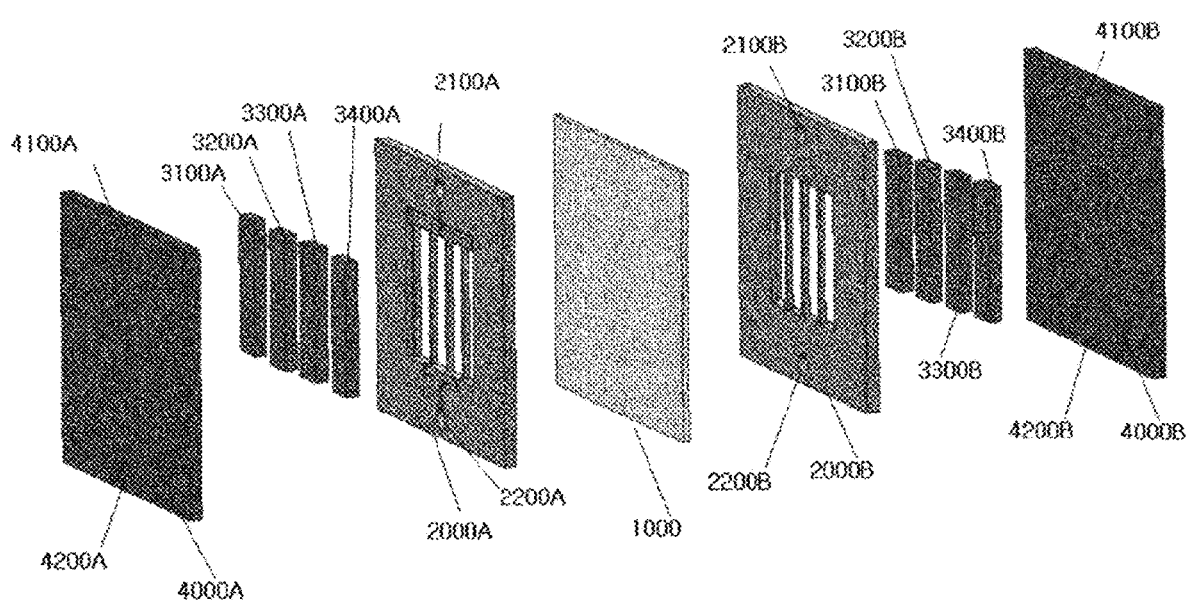
FIG. 6 is an exploded perspective view of a unit cell of a stack for a redox flow battery of the present invention.

FIG. 6 is an exploded perspective view of a unit cell of a stack for a redox flow battery of the present invention. It is shown that flow frames 200A and 200B and bipolar plates 4000A and 4000B are disposed at both sides of an ion-exchange membrane 1000 and two or more electrodes 3100A, 3200A, 3300A, and 3400A are disposed in two or more cavities 2610A, 2620A, 2630A, and 2640A (see FIG. 7) formed inside an outer frame 2700A of the flow frame 2000A, respectively. Also, similarly, it is shown that two or more electrodes 3100B, 3200B, 3300B, and 3400B are disposed in two or more cavities formed inside the flow frame 2000B.

The widths of the electrodes 3100A, 3200A, 3300A, and 3400A; 3100B, 3200B, 3300B, and 3400B shown in FIG. 6 are shown to be constant, but are not limited thereto, and the widths can be changed.

For reference, in the present invention, the outer frame 2700A is used to mean a frame excluding the side support walls 2311A, 2321A, 2331A; 2411A, 2421A, and the cavities 2610A, 2620A, 2630A, and 2640A located at the center in the flow frame 2000A.

Figure 7:
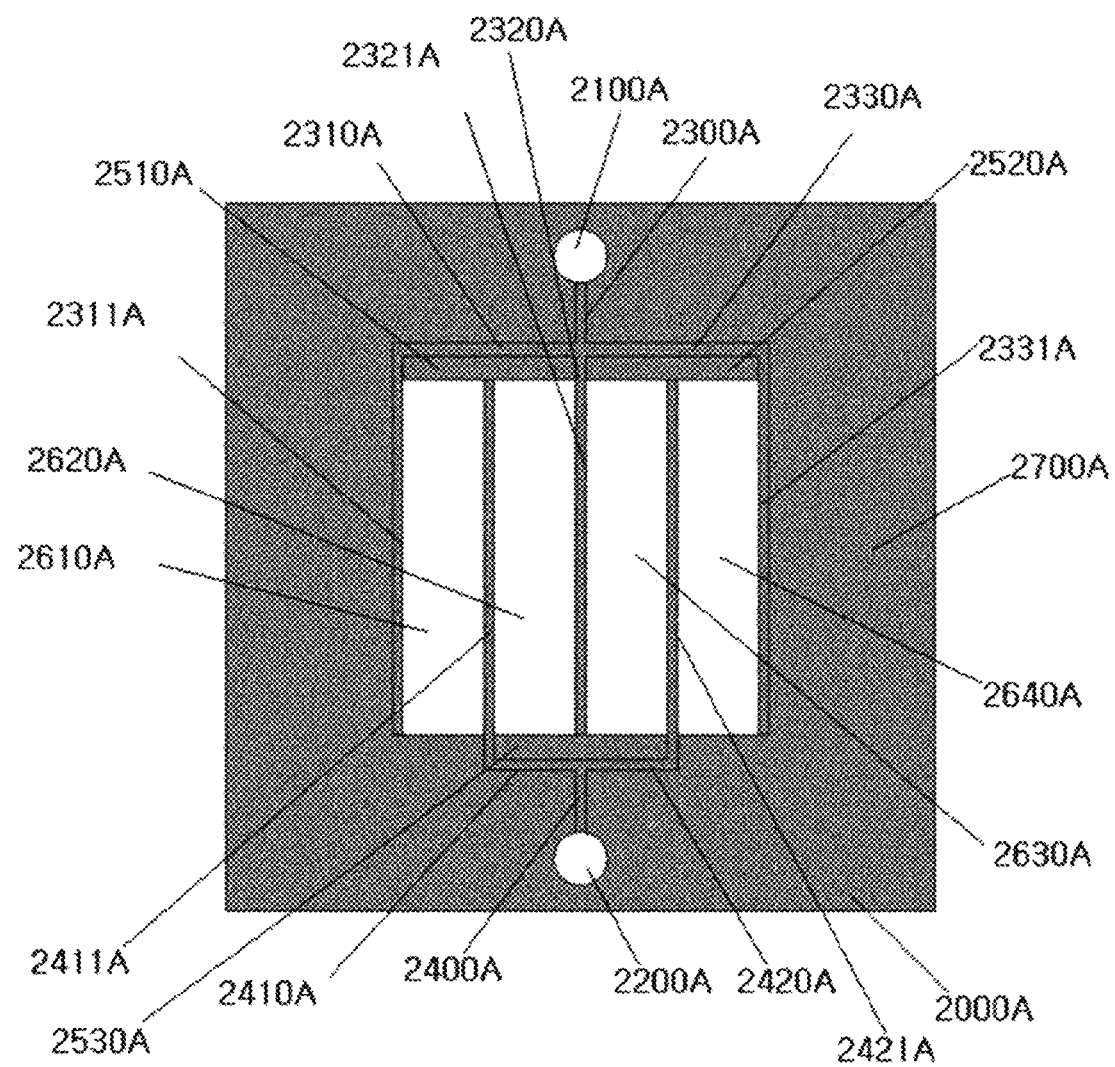
FIG. 7 is a front view of a flow frame of the stack for the redox flow battery of the present invention.
Figure 8:
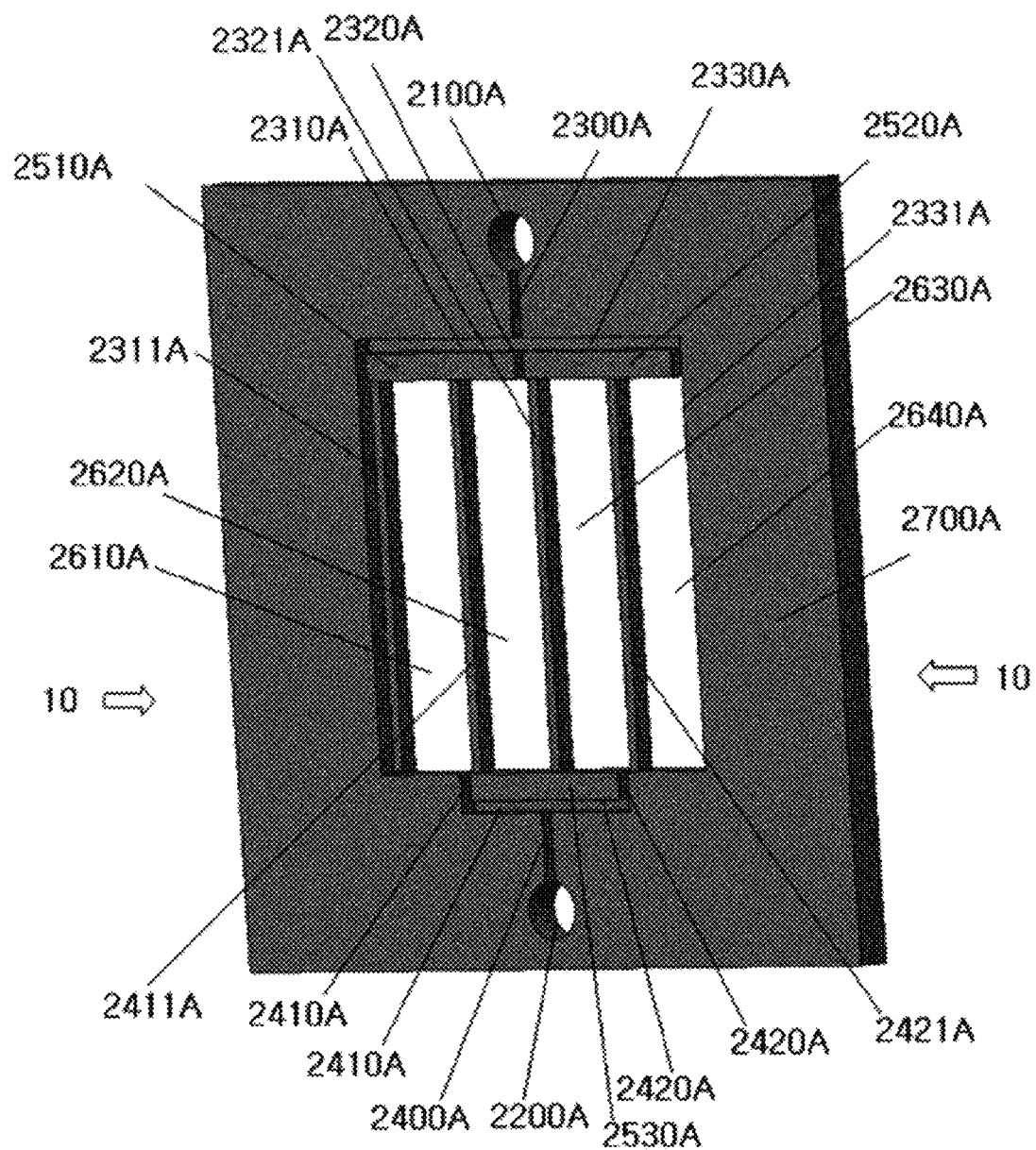
FIG. 8 is a three-dimensional perspective view of the flow frame of the stack for the redox flow battery of the present invention.

FIGS. 7 and 8 are a front view (an opposite surface of a surface facing an ion-exchange membrane) and a three-dimensional perspective view of the flow frame 2000A of the stack for the redox flow battery of the present invention.

Even in the outer frame 2700A of the flow frame 2000A of the present invention, like a conventional invention, holes 2100A and 2200A forming a manifold with the holes 4100A and 4200A of the bipolar plate 4000A and flow paths 2300A and 2400A are formed.

However, in the present invention, the flow paths 2300A and 2400A are connected to one or more sub flow paths 2310A, 2320A, 2330A; 2410A, 2420A, respectively.

Each of the sub flow paths 2310A, 2320A, 2330A; 2410A, 2420A is connected with the side support walls 2311A, 2320B, and 2310A of the cavities 2610A, 2620A, 2630A, and 2640A in which two or more electrodes 3100A, 3200A, 3300A, and 3400A are located.

The thickness of the side support walls 2311A, 2321A, 2331A; 2411A, 2421A is thinner than the entire thickness of the flow frame and the thickness of the electrode, and when the electrodes 3100A, 3200A, 3300A, and 3400A are disposed in the cavities 2610A, 2620A, 2630A, and 2640A, respectively, as shown in FIGS. 11 to 14, the upper portions of the side support walls 2311A, 2321A, 2331A; 2411A, 2421A form furrows 2312A, 2322A, 2332A; 2412A, 2422A connected to the sub flow paths 2310A, 2320A, 2330A; 2410A, 2420A, respectively.

The other ends which are not connected to the sub flow paths 2310A, 2320A, 2330A; 2410A, 2420A of the respective furrows 2312A, 2322A, 2332A; 2412A, 2422A are blocked by the frame 2700A of the flow frame or the upper support walls 2510A and 2520A or the lower support wall 2530A of the cavities 2610A, 2620A, 2630A, and 2640A.

Figure 9:
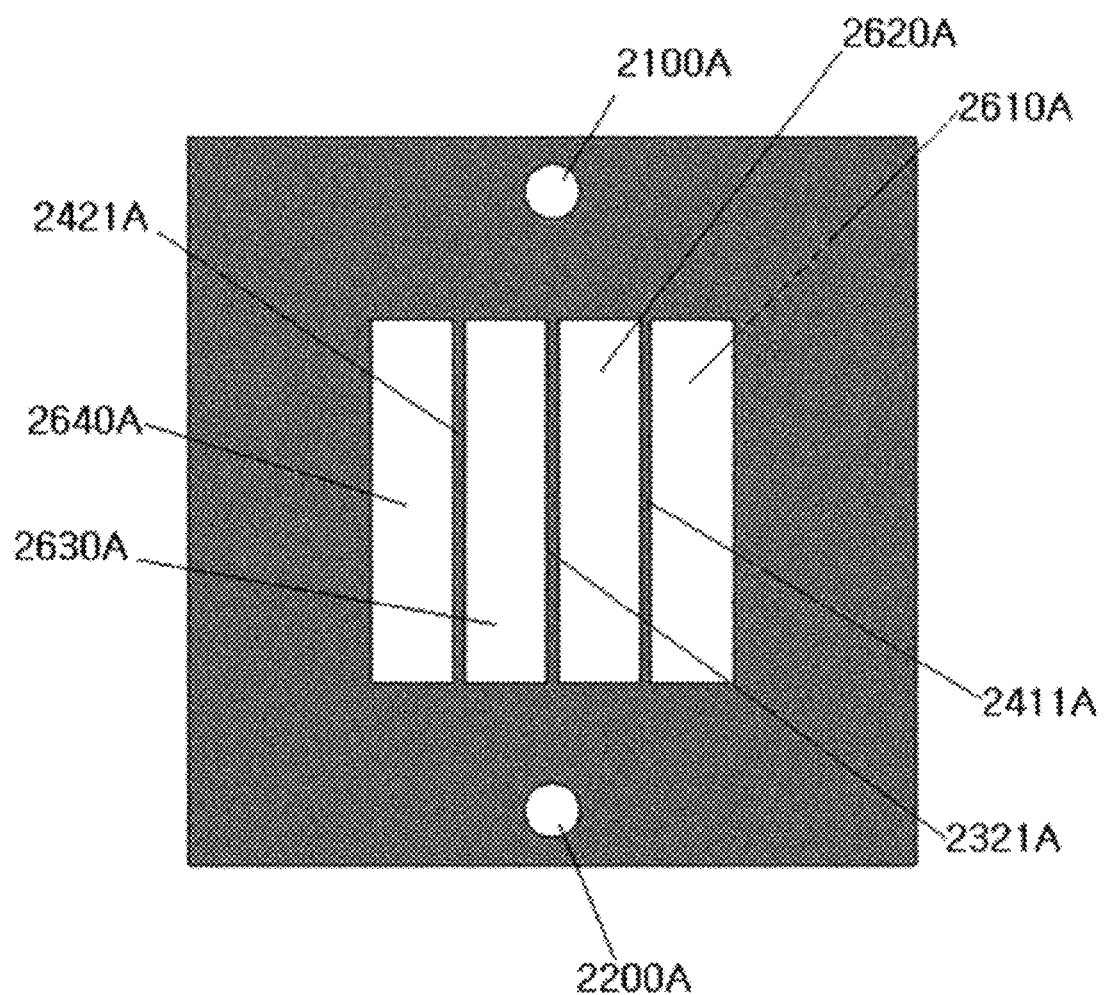
FIG. 9 is a rear view of the flow frame of the stack for the redox flow battery of the present invention.

FIG. 9 is a rear view (a surface facing the ion-exchange membrane) of the flow frame of the stack for the redox flow battery of the present invention and shows two or more cavities 2610A, 2620A, 2630A, and 2640A in which two or more electrodes 3100A, 3200A, 3300A, and 3400A are disposed, respectively, the side support walls 2412A, 2321A, and 2411A partitioning the cavities, and holes 2100A and 2200A forming the manifold.

In FIG. 9, the bottom surfaces of the side support walls 2412A, 2321A, and 2411A form the same plane as the bottom surface of the flow frame 2000A, but are not limited thereto and may float from the bottom surface.

Figure 10:
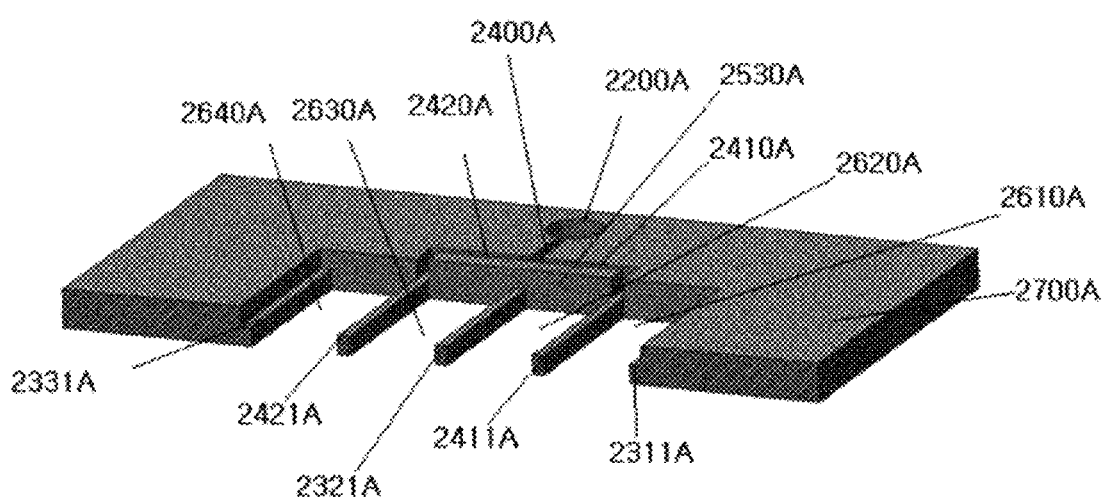
FIG. 10 is a cut perspective view of the flow frame of the stack for the redox flow battery of the present invention.

FIG. 10 shows a lower portion of the flow frame taken along an arrow 10 of FIG. 8 and shows the side support walls 2311A, 2321A, 2331A; 2411A, 2421A, in which it can be seen that one end of the side support walls 2331A and 2311A may be blocked by the outer frame 2700A of the flow frame and the other side support wall 2321A is blocked by the lower support wall 2530A.

The sub flow paths 2410A and 2420A are formed to be dented with a predetermined depth between the outer frame 2700A and the lower support portion 2530A and are connected to the flow path 2400A.

The dented depths of the sub flow paths 2410A and 2420A are equal to the depth of the furrow formed on the side support wall and will be equal to a value obtained by subtracting a thickness of the side support walls 2421A and 2411A from a thickness of the outer frame 2700A when the bottom surfaces of the side support walls 2412A, 2321A, and 2411A form the same plane as the bottom surface of the flow frame 2000A in FIG. 9.

Similarly, the dented depths of the sub flow paths 2310A, 2320A and 2330A in FIGS. 8 and 9 are equal to the depth of the furrow.

Figure 11:
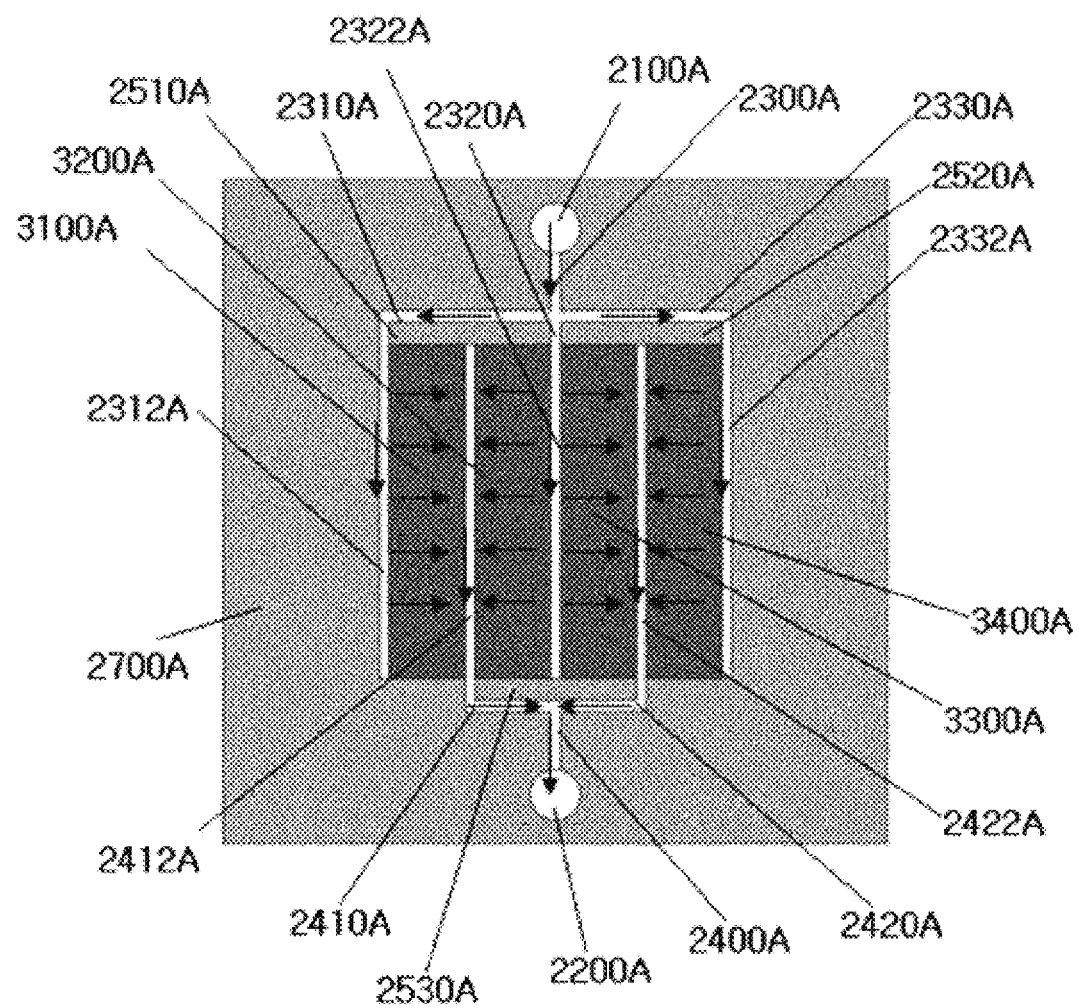
FIG. 11 shows an electrolyte flow on a front surface of the flow frame of the stack for the redox flow battery of the present invention.

FIG. 11 shows an electrolyte flow on the front surface (an opposite surface to the ion-exchange membrane side) of the flow frame while the stack for the redox flow battery of the present invention is assembled.

The electrolyte is supplied to the flow path 2300A of the flow frame through the hole 2100A of the flow frame forming the manifold and the electrolyte flowing through the flow path 2300A branches and flows to the sub flow paths 2310A, 2320A and 2330A.

The sub flow paths 2310A, 2320A and 2330A are connected to the furrows 2312A, 2322A, and 2332A formed on the side support walls 2311A, 2321A and 2331A between the electrodes 3100A, 3200A, 3300A and 3400A disposed in the cavities 2610A, 2620A, 2630A and 2640A and the outer frames 2700A, respectively, so that the electrolyte flows into the respective furrows 2312A, 2322A and 2332A along the sub flow paths 2310A, 2320A and 2330A.

As shown in FIGS. 8 and 9, the depths of the sub flow paths 2310A, 2320A, and 2330A are equal to the depths of the furrows 2312A, 2322A, and 2332A, so that the electrolyte flow paths become continuous.

The ends of the furrows 2312A and 2332A are blocked by the outer frame 2700A and the end of the furrow 2322A is blocked by the lower support wall 2530A.

Accordingly, the electrolyte (arrow direction) flowing along the furrows 2312A, 2322A, and 2332A flows toward the adjacent electrodes 3100A, 3200A, 3300A, and 3400A in a lateral direction because the ends are blocked.

The electrolyte flowing into the adjacent electrodes 3100A, 3200A, 3300A and 3400A flows into other furrows 2412A and 2422A as shown by arrows in FIG. 11, and the electrolyte flowing in the other furrows 2412A and 2422A flows into the flow path 2400A through the sub flow paths 2410A and 2420A and then discharged through the hole 2200A forming a discharge manifold.

That is, the electrolyte flowing in the furrow 2312A is directed to the adjacent electrode 3100A because the end of the furrow 2312A is blocked, and the electrolyte passing through the electrode 3100A flows to the sub flow path 2410A along the furrow 2412A. Also, the electrolyte flowing in the furrow 2322A is directed to the adjacent electrodes 3200A and 3300A because the end of the furrow 2322A is blocked, the electrolyte toward the electrode 3200A flows into the sub flow path 2410A along the furrow 2412A, and the electrolyte toward the electrode 3300A flows into the sub flow path 2420A along the furrow 2422A. Further, the electrolyte flowing in the furrow 2332A is directed to the adjacent electrode 3400A because the end of the furrow 2332A is blocked and the electrolyte passing through the electrode 3400A flows into the sub flow path 2420A along the furrow 2422A. The electrolyte flowing in the sub flow paths 2410A and 2420A flows into the hole 2200A through the flow path 2400A and is discharged.

Figure 12:
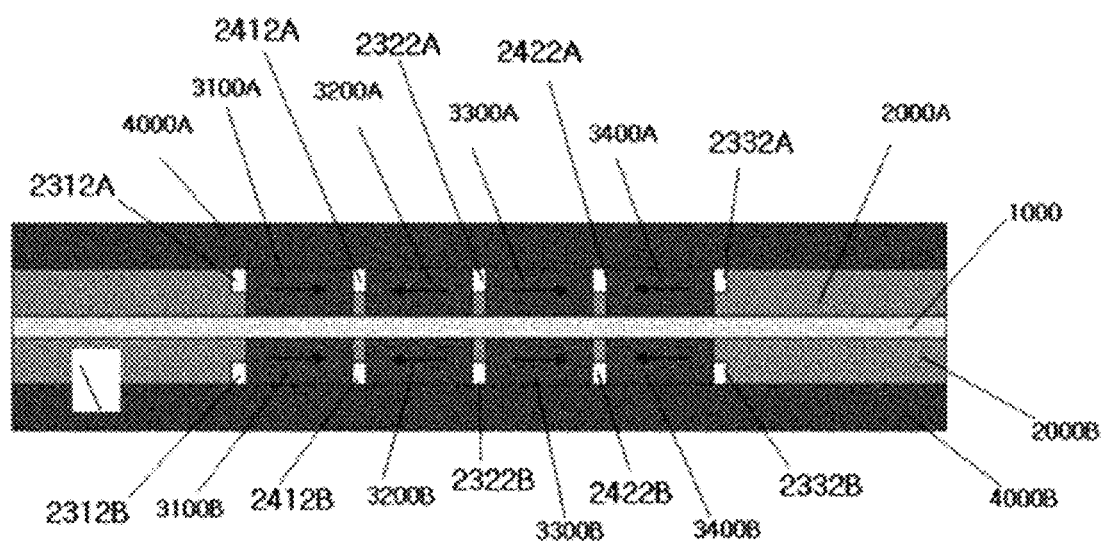
FIG. 12 shows an electrolyte flow direction on a cross section of the flow frame of the stack for the redox flow battery of the present invention.

FIG. 12 shows an electrolyte flow direction on a cross section of the stack for the redox flow battery of the present invention. The furrows 2312A, 2322A, 2332A; 2412A, 2422A formed in the flow frame 2000A which the electrolyte flows are formed in gaps between the electrodes 3100A and 3200A and the outer frame 2700A (see FIG. 8) on the side support walls 2311A, 2321A, 2331A; 2411A, 2421A (see FIG. 10).

Similarly, the flow frame 2000B also has furrows 2312B, 2322B, 2332B; 2412B, 2422B into which the electrolyte flows, so that the electrolyte passes through the electrodes in the direction of the arrow.

Figure 13:
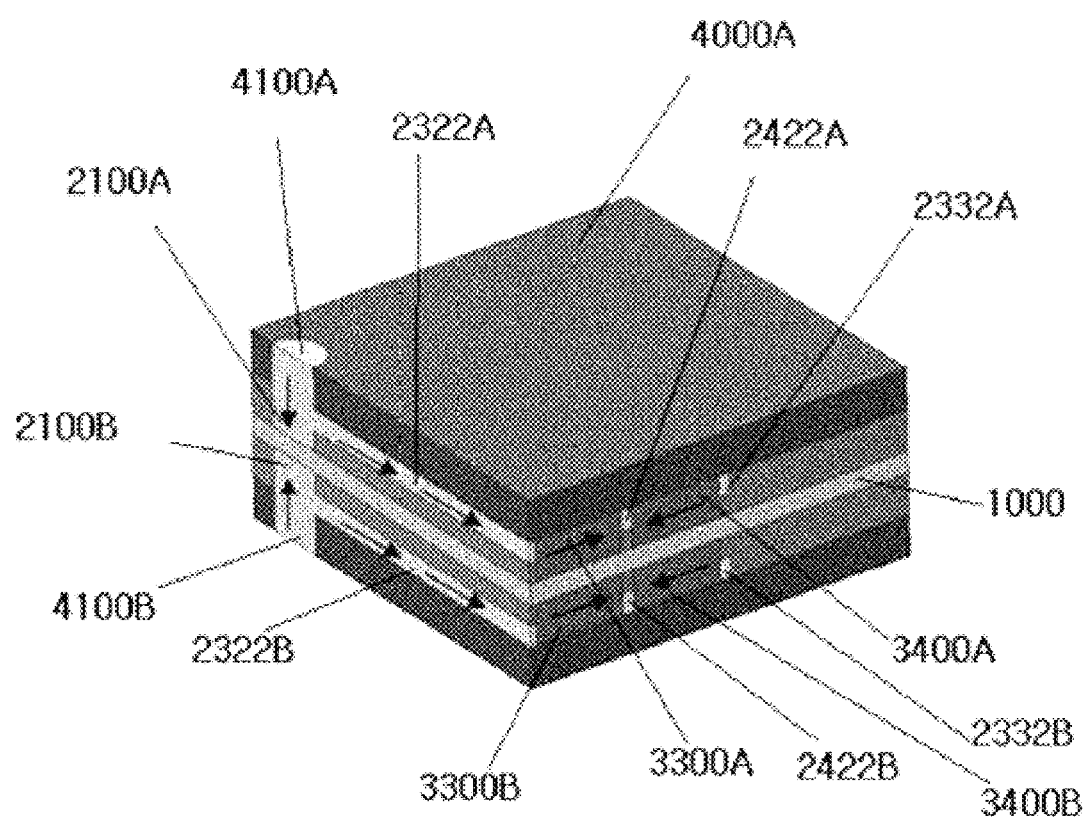
FIG. 13 shows an electrolyte flow direction in an exploded perspective view of the stack cut in a first quadrant of FIG. 11.

FIG. 13 is an exploded perspective view of the stack cut in a first quadrant of FIG. 11 and shows that the electrolyte flowing through the manifold formed by the holes 4100A and 2100A flows along the furrow 2322A via the flow path 2300A and the sub flow path 2320A and flows into the furrow 2422A via the electrode 3300A because the end of the furrow 2322A is blocked, and the electrolyte flowing in the furrow 2332A flows into the furrow 2422A through the electrode 3400A because the end of the furrow 2332A is blocked.

Similarly, the electrolyte flowing through the manifold formed of the holes 4100B and 2100AB flows along the furrow 2322B through the flow path and the sub flow path and flows into the furrow 2422B through the electrode 3300B because the end of the furrow 2322B is blocked, and the electrolyte flowing in the furrow 2332B flows into the furrow 2422B through the electrode 3300B because the end of the furrow 2332B is also blocked.

Figure 14:
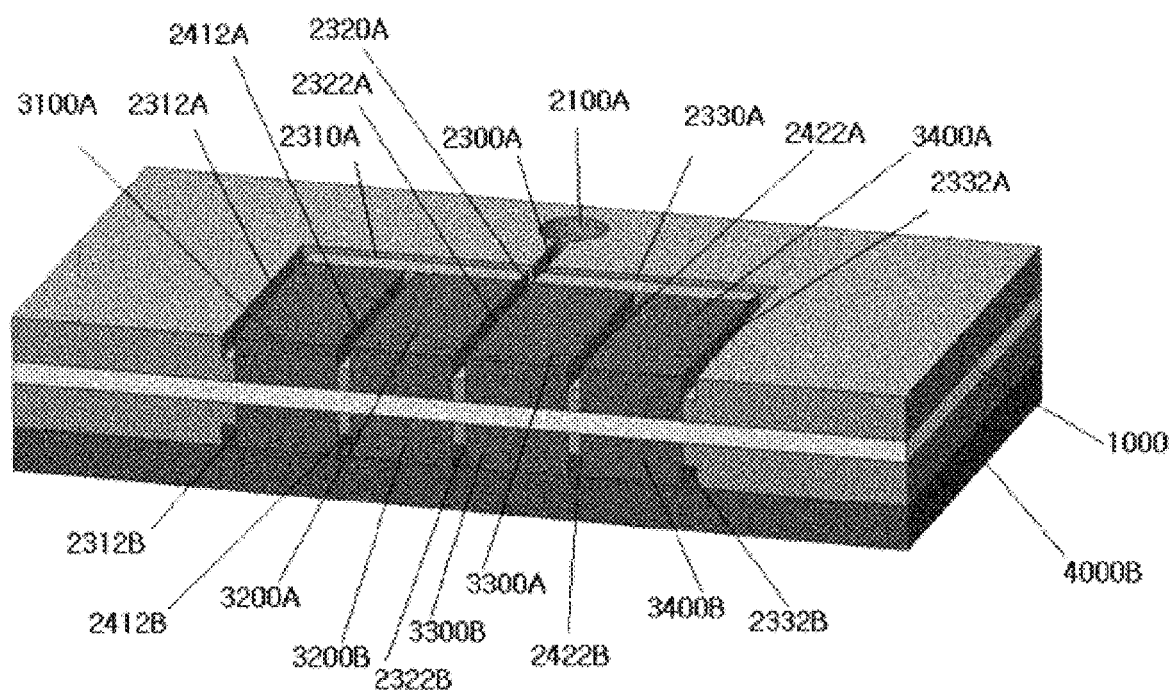
FIG. 14 is a cut perspective view of the stack for the redox flow battery of the present invention.

FIG. 14 is a cut perspective view of the stack for the redox flow battery of the present invention and shows a state in which no electrolyte flows.

As shown in FIG. 14, it can be seen that the furrows 2312A, 2322A, 2332A; 2412A, 2422A are formed on the side support walls 2311A, 2321A, 2331A; 2411A, 2421A (see FIG. 10) in gaps between the electrodes 3100A, 3200A, 3300A, and 3400A and the outer frame 2700A (see FIG. 8).

As such, in the present invention, the electrolyte flowing in the furrows formed on the side surface of the electrode is discharged through the adjacent furrows through the electrode, so that the length of the electrolyte passing through the electrode is much shorter than that of the conventional invention, thereby reducing the pressure drop. (The amount of pressure drop is proportional to the length L)

In the above description, it has been described that five furrows are formed in each of the flow frames. However, the number of furrows is not limited thereto, and may be changed to the number of two or more furrows.

In the above description, the electrolyte is supplied through the hole 2100A of the flow frame to be discharged to the hole 2200A, but on the contrary, the configuration in which the electrolyte is supplied from the hole 2200A to be discharged to the hole 2100A can be modified.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure. Accordingly, the spirit of the present invention should not be defined only by the described exemplary embodiments, and it should be appreciated that claims to be described below and all which are equivalent to the claims or equivalently modified to the claims are included in the scope of the spirit of the present invention.

In the drawings, the reference numbers disclosed in claims are inserted so as to more easily appreciate the present invention and the protection scope of the present invention is not limited to the reference numerals disclosed in the claims.

What is claimed is:

1. A redox flow battery stack comprising:
an ion-exchange membrane (1000);
two flow frames (2000A, 2000B) disposed on sides of the ion-exchange membrane (1000), respectively;
two bipolar plates (4000A, 4000B) disposed outside the two flow frames (2000A, 2000B), respectively; and
two electrodes (3100A, 3200A) disposed in each of the two flow frames (2000A, 2000B);
wherein
each of the two flow frames (2000A, 2000B) includes a first hole (2100A) forming an inlet manifold, a first flow path (2300A) connected to the first hole (2100A), two first sub flow paths (2310A, 2320A) connected to the first flow path (2300A), two cavities (2610A, 2620A), a second hole (2200A) forming an outlet manifold, a second flow path (2400A) connected to the second hole (2200A) and a second sub flow path (2410A) connected to the second flow path (2400A), three side support walls (2311A, 2411A, 2321A) located at sides of the two cavities (2610A, 2620A) and an outer frame (2700A) surrounding the three side support walls (2311A, 2411A, 2321A);
the two electrodes (3100A, 3200A) are respectively disposed in the two cavities (2610A, 2620A);
each of thicknesses of the three side support walls (2311A, 2411A, 2321A) is thinner than a thickness of the outer frame (2700A) and each of thicknesses of the three side support walls (2311A, 2411A, 2321A) is thinner than each of thicknesses of the two electrodes (3100A, 3400A);

upper surfaces of the three side support walls (2311A, 2411A, 2321A) are lower than an upper surface of the outer frame (2700A);

three furrows (2312A, 2412A, 2322A) are respectively formed on the upper surfaces of the three side support walls (2311A, 2411A, 2321A) and are blocked at one end by the outer frame (2700A);

two furrows (2312A, 2322A) of the three furrows (2312A, 2412A, 2322A) are directly connected to the two first sub flow paths (2310A, 2320A) and located outside of the two electrodes (3100A, 3200A);

another furrow (2412A) of the three furrows (2312A, 2412A, 2322A) is directly connected to the second sub flow path (2410A) and is located between the two electrodes (3100A, 3200A);

electrolyte provided from the first hole (2100A) flows into the first flow path (2300), the two first sub flow paths (2310A, 2320A) and the two furrows (2312A, 2322A) in sequence;

the electrolyte flowing in the two furrows (2312A, 2322A) is configured to flow through the two electrodes (3100A, 3200A) by the block end of the two furrows (2312A, 2322A), and the electrolyte flowing through the two electrodes (3100A, 3200A) flows into the other furrow (2412A) and the second sub flow path (2410A) in sequence; and depths of the first flow path (2300A), the two first sub flow paths (2310A, 2330A), the second flow path (2400A), the second sub flow path (2410A) and the three furrows (2312A, 2412A, 2322A) are equal.

* * * * *